(12) United States Patent
Yasui

(10) Patent No.: US 9,855,934 B2
(45) Date of Patent: Jan. 2, 2018

(54) ELECTRIC BRAKE SYSTEM WITH PARKING FUNCTION

(71) Applicant: NTN CORPORATION, Osaka (JP)

(72) Inventor: Makoto Yasui, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/026,330

(22) PCT Filed: Oct. 3, 2014

(86) PCT No.: PCT/JP2014/076516
§ 371 (c)(1),
(2) Date: Mar. 31, 2016

(87) PCT Pub. No.: WO2015/053180
PCT Pub. Date: Apr. 16, 2015

(65) Prior Publication Data
US 2016/0244035 A1     Aug. 25, 2016

(30) Foreign Application Priority Data

Oct. 10, 2013   (JP) .................................. 2013-212801

(51) Int. Cl.
*B60T 7/12* (2006.01)
*B60T 13/74* (2006.01)
(Continued)

(52) U.S. Cl.
CPC ............ *B60T 7/122* (2013.01); *B60T 13/741* (2013.01); *F16D 65/18* (2013.01); *F16D 71/04* (2013.01);
(Continued)

(58) Field of Classification Search
CPC . B60T 7/12; B60T 7/122; B60T 13/74; B60T 13/741; F16D 63/002;
(Continued)

(56) References Cited

U.S. PATENT DOCUMENTS 6,199,670 B1   3/2001  Shirai et al.
6,311,808 B1  11/2001  Halasy-Wimmer et al.
(Continued)

FOREIGN PATENT DOCUMENTS

| JP | 2006-82809  | 3/2006  |
| JP | 2006-327587 | 12/2006 |
| JP | 2012-87889  | 5/2012  |

OTHER PUBLICATIONS

Extended European Search Report dated Oct. 6, 2016 in European Application No. 14852978.7.
(Continued)

*Primary Examiner* — Thomas J Williams
(74) *Attorney, Agent, or Firm* — Wenderoth, Lind & Ponack, L.L.P.

(57) ABSTRACT

An electric brake system with a parking function is configured to actuate an electric motor when there exists a request to apply a parking brake. With the motor being actuated, the electric brake system moves a locking pin from an unlocking position to a parking/locking position. The electric brake system is further configured to prohibit the actuation of the electric motor even if the brake pedal is operated while the vehicle is at a stop and when the parking brake operation has stopped.

5 Claims, 12 Drawing Sheets

(51) Int. Cl.
*F16D 65/18* (2006.01)
*F16D 71/04* (2006.01)
*F16H 25/22* (2006.01)
F16D 121/14 (2012.01)
F16D 125/40 (2012.01)
F16D 125/48 (2012.01)
F16D 127/06 (2012.01)
F16D 129/08 (2012.01)

(52) U.S. Cl.
CPC ..... *F16H 25/2252* (2013.01); *F16D 2121/14* (2013.01); *F16D 2125/40* (2013.01); *F16D 2125/48* (2013.01); *F16D 2127/06* (2013.01); *F16D 2129/08* (2013.01)

(58) Field of Classification Search
CPC ........ F16D 63/006; F16D 65/18; F16D 71/04; F16D 2121/14; F16D 2121/18; F16D 2121/24; F16D 2125/40; F16D 2125/48; F16D 2127/06; F16D 2129/08; F16H 25/2252
See application file for complete search history.

(56) References Cited

U.S. PATENT DOCUMENTS

| | | | | |
|---|---|---|---|---|
| 7,448,699 | B2* | 11/2008 | Manaka | B60T 7/122 188/71.9 |
| 7,850,255 | B2* | 12/2010 | Kawahara | B60T 7/12 303/122.1 |
| 9,182,021 | B2* | 11/2015 | Muramatsu | F16D 55/226 |
| 2002/0109403 | A1 | 8/2002 | Yamamoto et al. | |
| 2011/0139555 | A1 | 6/2011 | Hori | |
| 2013/0186717 | A1 | 7/2013 | Muramatsu et al. | |
| 2014/0015310 | A1* | 1/2014 | Hanzawa | B60T 7/12 303/3 |
| 2014/0257643 | A1* | 9/2014 | Dufford | B60T 1/005 701/45 |

OTHER PUBLICATIONS

International Search Report dated Dec. 22, 2014 in corresponding International Application No. PCT/JP2014/076516 (with English translation).

* cited by examiner

ELECTRIC BRAKE SYSTEM WITH PARKING FUNCTION

TECHNICAL FIELD

The present invention relates to an electric brake system with a parking function which includes an electric motor as a driving source and has a parking brake function.

BACKGROUND ART

Old vehicle brake systems are mostly hydraulic ones which use hydraulic power as their driving source. However, with the introduction of sophisticated brake controls such as anti-lock brake systems (ABS's), electric brake systems are gathering much attention these days because electric brake systems are capable of improving the performance of these brake controls. Such an electric brake system includes an electric motor as a driving source for a braking mechanism for applying a braking force to each vehicle wheel, and configured to generate the braking force by actuating the motor when the brake pedal is operated.

The applicant of this application has proposed an electric brake system having the parking brake function, namely the function of continuously applying a parking brake to a wheel of a vehicle while the vehicle is parked (below-identified Patent document 1).

The electric brake system with a parking function disclosed in Patent document 1 includes an electric motor, a braking mechanism configured to press a friction pad against a rotor which rotates together with a wheel of a vehicle, under the power of the electric motor, thereby applying a braking force to the wheel, an intermediate gear disposed in the power transmission path through which the power of the electric motor is transmitted to the braking mechanism, and a locking pin capable of engaging in and disengaging from any one of engaging holes formed in a side surface of the intermediate gear. The locking pin can be advanced and retracted between a parking/locking position at which the locking pin is engaged in one of the engaging holes, and an unlocking position at which the locking pin is engaged in none of the engaging holes. By advancing the locking pin with a locking pin-driving locking actuator, the locking pin can be engaged in one of the engaging holes, thereby preventing rotation of the intermediate gear.

To apply the parking brake, the electric motor is actuated to apply the braking force, and with the braking force applied to the wheel, the locking pin is advanced by the locking actuator until the locking pin is engaged in one of the engaging holes formed in the side surface of the intermediate gear.

When the parking brake operation has completed, torque in the brake-releasing direction (reaction force torque) is being applied to the intermediate gear due to the reaction force to the pressing force with which the friction pad is pressed against the disk rotor, so that the locking pin is kept engaged in the engaging hole by the frictional resistance generated between the intermediate gear and the locking pin due to the reaction force torque. This allows the braking force to be continuously applied to the vehicle wheel even after the electric motor is de-activated, while the vehicle is parked.

PRIOR ART DOCUMENT(S)

Patent Document(s)

Patent document 1: JP Patent Publication 2012-87889A

Generally speaking, while the vehicle is at a stop, and the parking brake is being applied, the vehicle is kept at a stop without the need to operate the brake pedal. However, even in such a situation, a driver may sometimes depress the brake pedal. (For example, the driver may depress the brake pedal while waiting at the red light with the parking brake applied, or may unconsciously depress the brake pedal while waiting in the parked vehicle.)

Similarly, the driver in a vehicle on which is mounted the electric brake system disclosed in Patent document 1 may also depress the brake pedal while the vehicle is at a stop and the parking brake is being applied. If the electric motor is actuated when the brake pedal is operated in such a situation, and once the torque transmitted from the electric motor to the intermediate gear exceeds the reaction force torque (i.e. the torque applied to the intermediate gear in the brake-releasing direction due the reaction force to the pressing force with which the friction pad is pressed against the disk rotor when the parking brake is applied), the frictional resistance between the intermediate gear and the locking pin may disappear, causing the locking pin to be disengaged from the engaging hole of the intermediate gear.

If this happens, when the driver releases the brake pedal thereafter, the locking pin remains disengaged from the engaging hole of the intermediate gear (and thus the parking brake disengaged) in spite of the fact that the driver believes that the parking brake is being applied.

If the vehicle is on a slope when this happens, the vehicle will spontaneously begin to move under the weight of the vehicle. Even if the vehicle is on a horizontal road surface, if the vehicle is an AT or CVT vehicle with a torque converter, the vehicle will still begin to move spontaneously due to creep torque transmitted to the wheels from the engine through the torque converter. This poses a grave danger.

An object of the present invention is to provide an electric brake system with a parking function which is capable of preventing untimely release of the parking brake if the brake pedal is operated when the parking brake operation has completed.

Means for Achieving the Object

In order to achieve this object, the present invention provides an electric brake system with a parking function comprising:

an electric motor;

a braking mechanism configured to press a friction member against a rotor which rotates together with a wheel of a vehicle, under the power of the electric motor, thereby applying a braking force to the wheel;

a rotary member disposed in the power transmission path through which the power of the electric motor is transmitted to the braking mechanism;

a locking member movable between a parking/locking position at which the locking member is brought into engagement with the rotary member in such a manner that the rotary member is prevented from rotating in a brake-releasing direction in which the braking force is released, and an unlocking position at which the locking member is disengaged from the rotary member;

a locking actuator configured to move the locking member between the parking/locking position and the unlocking position; and a brake controller for controlling the electric motor and the locking actuator, wherein the brake controller comprises:

a service brake control means for performing a control in which when a brake pedal of the vehicle is operated, the electric motor is actuated to apply the braking force to the wheel;

a parking brake control means for performing a control in which when there exists a request to apply a parking brake, the electric motor is actuated to apply the braking force to the wheel, and with the braking force applied to the wheel, the locking actuator is actuated to move the locking member from the unlocking position to the parking/locking position;

a parking brake determining means configured to determine whether or not a parking brake operation by the parking brake control means has completed;

a vehicle stoppage determining means configured to determine whether or not the vehicle is at a stop; and a motor actuation prohibiting means configured to prohibit the service brake control means from actuating the electric motor when the vehicle stoppage determining means determines that the vehicle is at a stop, and when the parking brake determining means determines that the parking brake operation has completed.

With this arrangement, while the vehicle is at a stop and the parking brake operation has completed, since the motor actuation prohibiting means prohibits the service brake control means from actuating the electric motor even if the brake pedal is operated, no torque is transmitted from the electric motor to the rotary member, so that it is possible to prevent the locking member from disengaging from the rotary member.

Preferably, the brake controller further comprises a motor actuation permitting means configured to permit the service brake control means to actuate the electric motor when the vehicle stoppage determining means determines that the vehicle is not at a stop, and when the brake pedal is operated.

With this arrangement, even after the parking brake operation has completed, if the vehicle is not at a stop, it is possible to actuate the electric motor corresponding to the operation of the brake pedal. This makes it possible to apply a braking force as a service brake if, for example, the vehicle should begin to move due e.g. to the gradient of the road surface in spite of the fact that the parking brake is applied, and the driver depresses the brake pedal in an attempt to stop the vehicle. This feature thus ensures safety of the vehicle.

The vehicle stoppage determining means may be configured to determine whether or not the vehicle is at a stop based on the current position of the vehicle detected by a GPS receiver on board the vehicle. In this case, however, while the vehicle is hidden from a GPS satellite by e.g. a building, it may become difficult to determine whether or not the vehicle is at a stop with high accuracy. Therefore, the vehicle stoppage determining means is preferably configured to determine whether or not the vehicle is at a stop based on an output signal of a vehicle speed sensor for detecting the rotation of the wheel. With the latter arrangement, it is possible to accurately determine whether or not the vehicle is at a stop even while the vehicle is behind e.g. a building, thus ensuring more accurate control.

The parking brake control means may comprise:

a motor actuation control means configured, when there exists the request to apply the parking brake, to actuate the electric motor such that a pressing force with which the friction member is pressed against the rotor reaches a predetermined target value;

a locking actuator actuation control means configured, when the pressing force reaches the target value by the motor actuation control means, to actuate the locking actuator such that the locking member moved from the unlocking position to the parking/locking position;

a motor de-energizing control means configured to de-energize the electric motor while the locking actuator is being actuated after the locking actuator is actuated by the locking actuator actuation control means; and a locking actuator de-energizing control means configured to de-energize the locking actuator after the electric motor is de-energized by the motor de-energizing control means.

With this arrangement, when there exists a request to apply the parking brake, the electric motor is actuated so that the pressing force with which the friction member is pressed against the rotor reaches the target value; the locking actuator is actuated when the pressing force reaches the target value by actuating the electric motor; thereafter, with the locking actuator being actuated, the electric motor is de-energized; and then the locking actuator is de-energized. When the locking actuator is actuated, or when the electric motor is de-energized with the locking actuator being actuated, the locking member comes into engagement with the rotary member. Since, after the electric motor is de-energized, torque in the brake-releasing direction (reaction force torque) is applied to the rotary member due to the reaction force to the pressing force with which the friction member is pressed against the rotor, the rotary member and the locking member remain engaged with each other even after the locking actuator is de-energized, by the frictional resistance generated between the rotary member and the locking member due to the reaction force torque. Since, as a result, the braking force is continuously applied to the wheel after the electric motor and the locking actuator are de-energized, it is possible to reduce the power consumption while the parking brake is being applied.

Preferably, the parking brake control means further comprises a target value correcting means for correcting the target value such that the target value is larger when the vehicle is on an inclined road surface than when the vehicle is on a road surface not inclined.

With this arrangement, the pressing force with which the friction force is pressed against the rotor becomes larger when the parking brake is applied while the vehicle is on an inclined road surface than when the parking brake is applied while the vehicle is on a road surface not inclined. This prevents the vehicle from beginning to move while the parking brake is being applied with the vehicle on an inclined road surface, and thus improves the safety of the vehicle.

Advantages of the Invention

The electric brake system with a parking function according to the present invention is configured such that the motor actuation prohibiting means prohibits the actuation of the electric motor even if the driver unconsciously operates the brake pedal, while the vehicle is at a stop and the parking brake operation has completed, and thus is capable of preventing the locking member from being disengaged from the rotary member against the will of the driver due to the torque applied from the electric motor to the rotary member. Thus, the electric brake system with a parking function according to the present invention is capable of preventing untimely release of the parking brake once the parking brake operation has completed.

MODE FOR EMBODYING THE INVENTION

The electric brake system having a parking brake function embodying the present invention is now described. This electric brake system has the function, as a service brake, of generating a braking force corresponding to the operation of the brake pedal, and also has a parking brake function, namely, the function of continuously applying a braking force to a wheel of a vehicle while the vehicle is parked.

Figure 1:
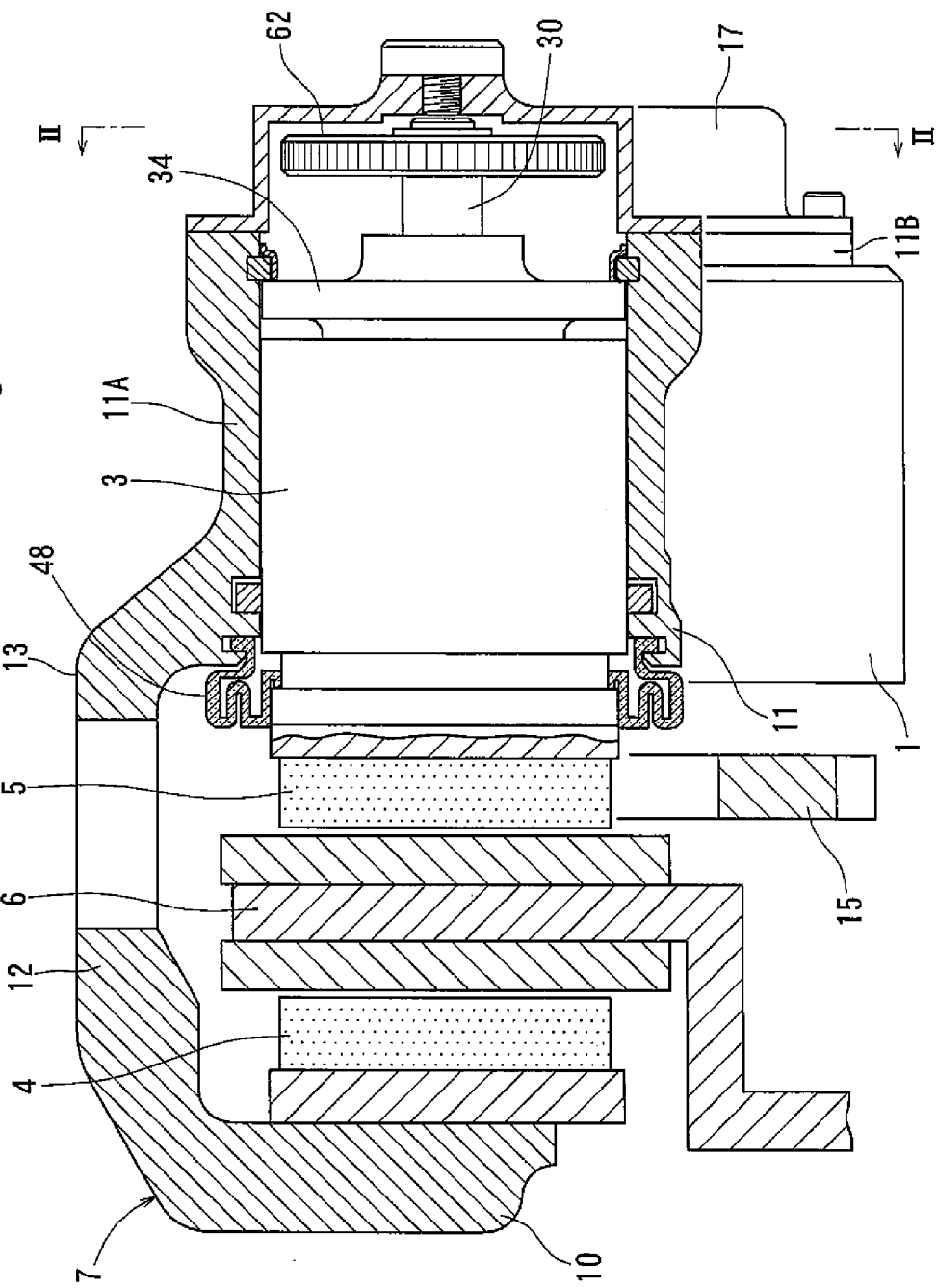
FIG. 1 is a sectional view of an electric brake system embodying the present invention.
Figure 2:
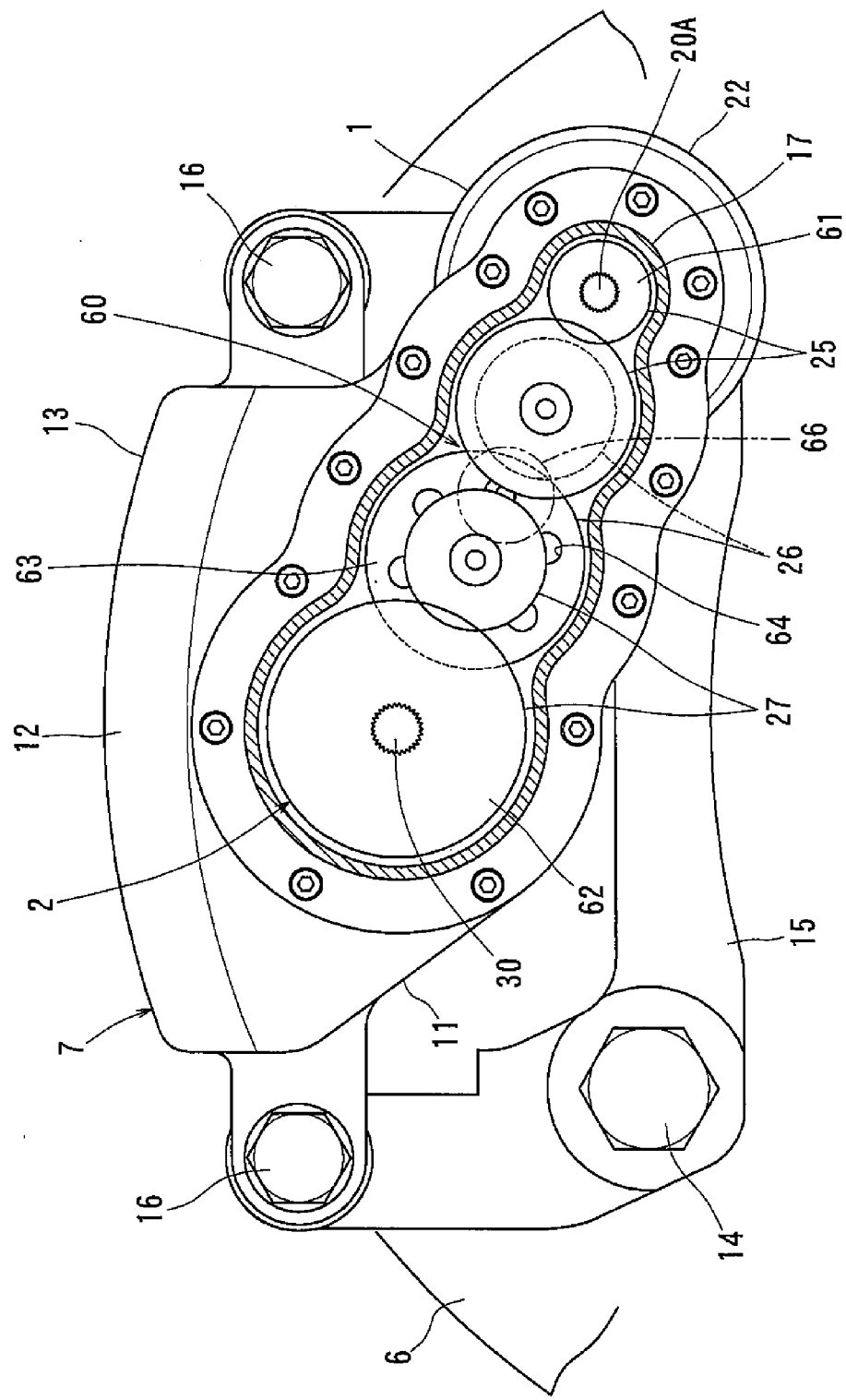
FIG. 2 is a sectional view taken along line II-II of FIG. 1.
Figure 3:
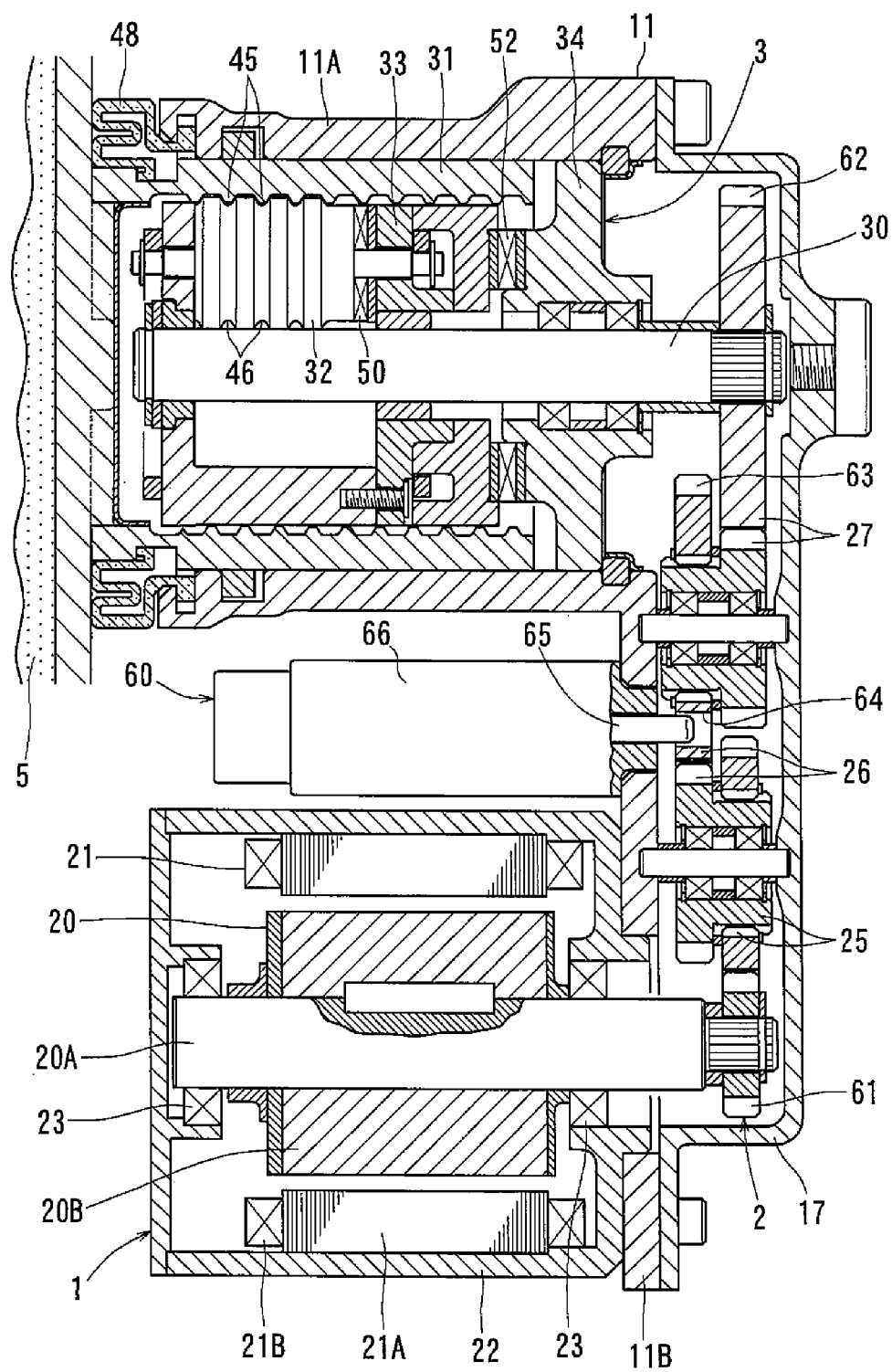
FIG. 3 is a sectional view of the electric brake system of FIG. 1, as viewed from radially inside of the disk rotor.

As shown in FIGS. 1 to 3, the electric brake system includes an electric motor 1, a speed reduction mechanism 2 for outputting the rotation of the electric motor 1 after reducing its speed, a linear motion mechanism 3 for converting the rotation reduced by the speed reduction mechanism 2 to a linear motion, and a braking mechanism 7 including a pair of friction pads 4 and 5 and configured to press the friction pads 4 and 5 against a disk rotor 6 under the power transmitted from the electric motor 1 through the speed reduction mechanism 2 and the linear motion mechanism 3, thus generating a braking force.

As shown in FIG. 1, the braking mechanism 7 includes a caliper body 13 including a pair of opposed portions 10 and 11 which is opposed to each other with the disk rotor 6, which rotates together with a vehicle wheel, disposed therebetween, and coupled to each other through a bridge 12 located radially outwardly of the disk rotor 6. The pair of friction pads 4 and 5 of the braking mechanism 7 are disposed between the respective opposed portions 10 and 11 of the caliper body 13 and the disk rotor 6, namely, on the respective sides of the disk rotor 6. The linear motion mechanism 3 is disposed behind the friction pad 5.

As shown in FIG. 2, the caliper body 13 is supported by a pair of slide pins 16 mounted to a caliper bracket 15 fixed by a bolt 14 to a knuckle (not shown) supporting the wheel, so as to be movable in the axial direction of the disk rotor 6, whereby when the friction pad 5 is pressed against the disk rotor 6 by the linear motion mechanism 3, shown in FIG. 1, the caliper body 13 is moved in the axial direction of the disk rotor 6 under the reaction force from the disk rotor 6, and due to the movement of the caliper body 13 in this direction, the other friction pad 4 is also pressed against the disk rotor 6.

As shown in FIG. 3, the opposed portion 11, located where there is the linear motion mechanism 3, is constituted by a cylindrical linear motion mechanism housing 11A which is open at the axially forward and rearward ends thereof, and a caliper flange 11B extending from the axially rearward end of the linear motion mechanism housing 11A in the direction perpendicular to the axial direction of the linear motion mechanism 3 (direction parallel to the disk rotor 6). The linear motion mechanism 3 is received in the linear motion mechanism housing 11A. The electric motor 1 is mounted to the caliper flange 11B to extend parallel to the linear motion mechanism 3. A speed reduction mechanism cover 17 covers the opening of the linear motion mechanism housing 11A at its axially rearward end and the side surface of the caliper flange 11B. The speed reduction mechanism 2 is mounted in the speed reduction mechanism cover 17.

The electric motor 1 includes a rotor 20, a stator 21, and a motor housing 22. The motor housing 22 is fixed to the caliper flange 11B. The rotor 20 is constituted by a rotor shaft 20A rotatably supported by two bearings 23 fitted to the motor housing 22, and a rotor core 20B fixed to the outer periphery of the rotor shaft 20A. The stator 21 is constituted by stator core 21A fixed to the inner periphery of the motor housing 22, and electromagnetic coils 21B wound around the stator cores 21A. When the electromagnetic coils 21B are energized, torque is generated in the rotor core 20B due to the electromagnetic force generated between the stator cores 21A and the rotor core 20B, and this torque rotates the rotor shaft 20A together with the rotor core 20B.

The speed reduction mechanism 2 includes a first gear train 25 through which the rotation of the rotor shaft 20A of the electric motor 1 is transmitted after being reduced in speed, a second gear train 26 through which the rotation transmitted from the first gear train 25 after further being reduced in speed, and a third gear train 27 through which the rotation transmitted from the second gear train 26 is transmitted to a rotary shaft 30 of the linear motion mechanism 3 after further being reduced in speed, whereby the rotation from the electric motor 1 is reduced in a stepwise manner by the gear trains 25, 26 and 27, and transmitted to the linear motion mechanism 3. In this embodiment, the speed reduction mechanism 2 includes three gear trains so that the rotation is reduced in three steps, but may include only two or more than three gear trains so that the rotation is reduced in two steps or in four or more steps.

The speed reduction mechanism 2 includes a locking mechanism 60 (to be described later) which is switchable between a parking/locking position at which the locking mechanism 60 prevents rotation of gears in a direction in which the braking force is released and an unlocking position at which the locking mechanism permits rotation of gears in a direction in which the braking force is released.

Figure 4:
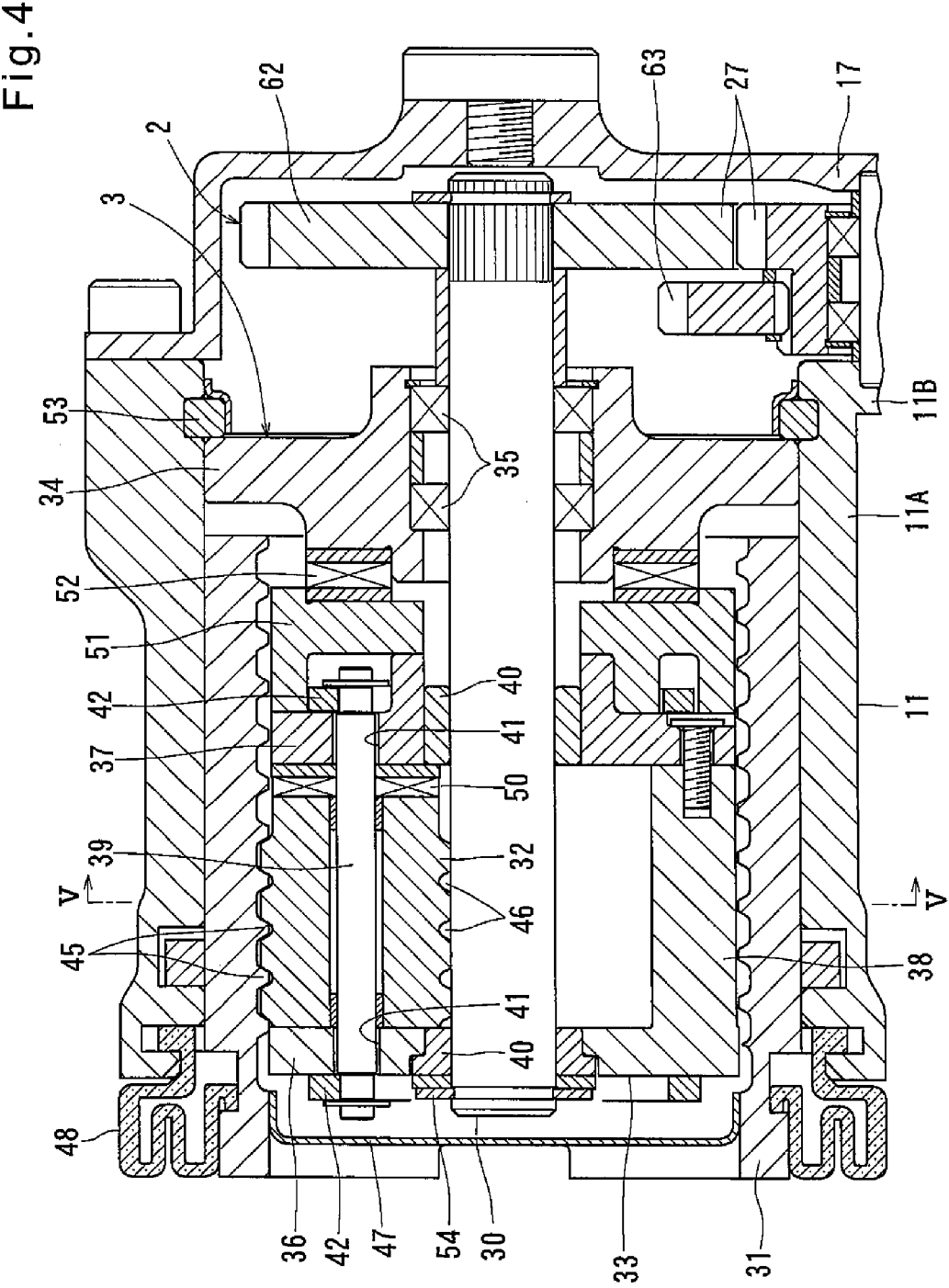
FIG. 4 is an enlarged sectional view of and around a linear motion mechanism shown in FIG. 3.

As shown in FIG. 4, besides the rotary shaft 30, to which the rotation is transmitted from the speed reduction mechanism 2, the linear motion mechanism 3 includes an outer ring member 31 surrounding the rotary shaft 30 so as to be coaxial with the rotary shaft 30, a plurality of planetary rollers 32 kept in contact with the rotary shaft 30 from radially outside, and with the outer ring member 31 from radially inside, and a carrier 33 supporting the planetary rollers 32 so as to be capable of rotating about their own axes and revolve around the rotary shaft 30.

An annular bearing support member 34 is mounted in the linear motion mechanism housing 11A at a location axially rearwardly spaced from the outer ring member 31. The rotary shaft 30 is rotatably supported by two radial bearings 35 fitted in the inner periphery of the bearing support member 34. The outer ring member 31 is in engagement with the back surface of the friction pad 5, and is thus rotationally fixed to the linear motion mechanism housing 11A, while being supported by the inner surface of the linear motion mechanism housing 11A so as to be movable in the axial direction (see FIG. 3).

Figure 5:
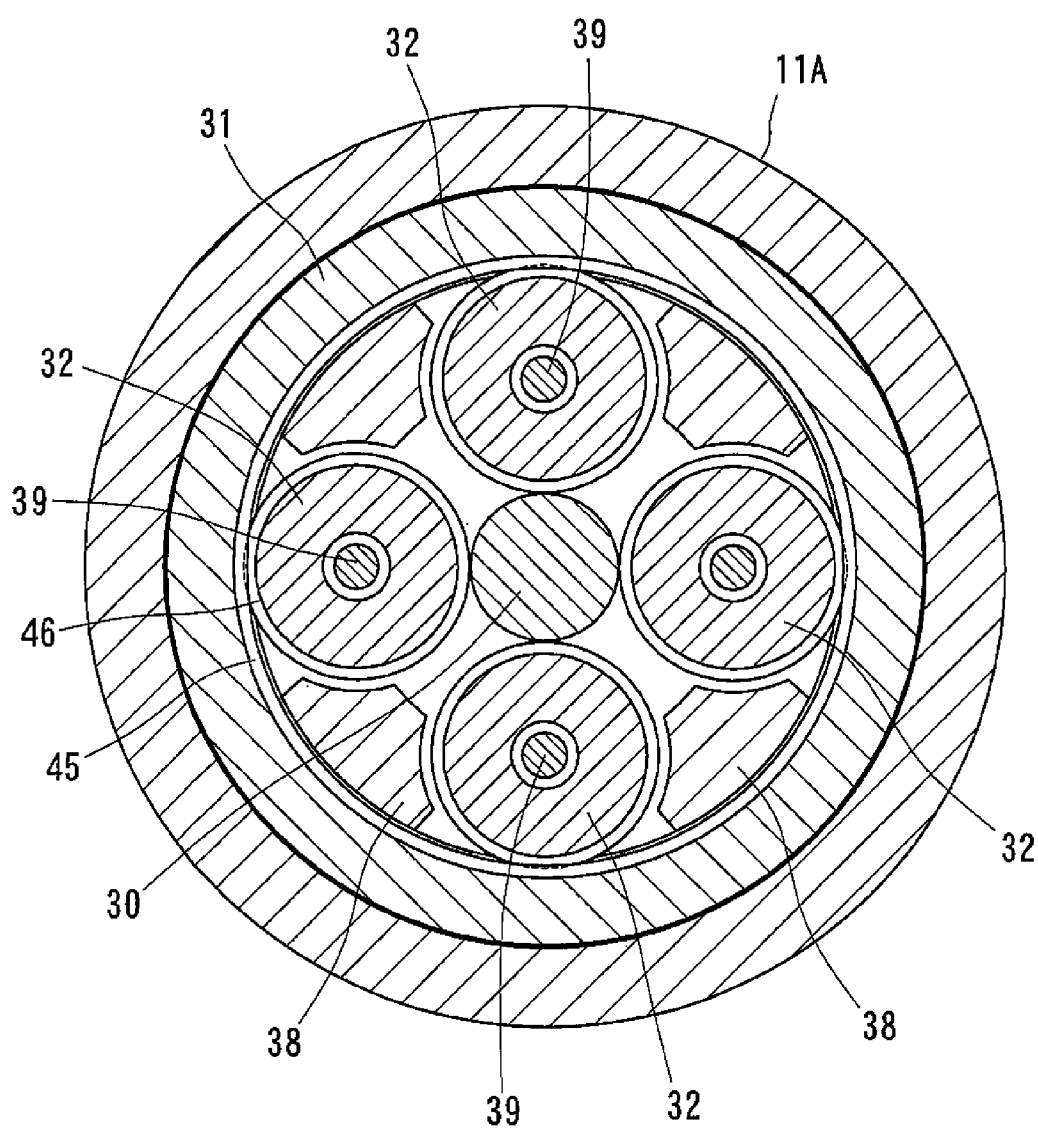
FIG. 5 is a sectional view taken along line V-V of FIG. 4.

As shown in FIG. 5, the planetary rollers 32 are spaced apart from each other in the circumferential direction, and are kept in rolling contact with the outer periphery of the rotary shaft 30 and the inner periphery of the outer ring member 31. The outer periphery of the rotary shaft 30 forms a cylindrical surface. With this arrangement, when the rotary shaft 30 rotates, the planetary rollers 32 rotate about respective roller shafts 39 of the carrier 33, while revolving around the rotary shaft 30. In particular, the planetary rollers 32 rotate about the respective roller shafts 39 under the torque transmitted from the outer periphery of the rotary shaft 30, and as the planetary rollers 32 rotate about the roller shafts 39, the planetary rollers 32 revolve around the rotary shaft 30 while rolling on the inner periphery of the outer ring member 31.

As shown in FIG. 4, besides the roller shafts 39, which support the planetary rollers 32 so as to be rotatable about the roller shafts 39, the carrier 33 includes a pair of carrier plates 36 and 37 axially opposed to each other with the planetary rollers 32 disposed therebetween, and coupling portions 38 axially extending between the respective circumferentially opposed pairs of planetary rollers 32 and coupling the carrier plates 36 and 37 together. The carrier plates 36 and 37 are annular members through which the rotary shaft 30 extends. A slide bearing 40 is fitted in the inner periphery of each carrier plate 36, 37 so as to be kept in sliding contact with the outer periphery of the rotary shaft 30.

Each roller shaft 39 has its respective end portions radially movably supported in elongated holes 41 formed in the respective carrier plates 36 and 37. Two elastic rings 42 are wrapped around, from radially outside, the respective end portions of the roller shafts 39 such that all of the planetary rollers 32, which are circumferentially spaced apart from each other, are pressed against the outer periphery of the rotary shaft 30 by the elastic rings 42, thereby preventing slippage between the planetary rollers 32 and the rotary shaft 30.

The outer ring member 31 has, on its inner periphery, a helical rib 45, i.e. a rib extending obliquely to the circumferential direction. The planetary rollers 32 are formed, on their outer peripheries, with circumferential grooves 46 in which the helical rib 45 is engaged. Thus, when the planetary rollers 32 revolve around the rotary shaft 30 while rolling on the inner periphery of the outer ring member 31, the outer ring member 31 and the planetary rollers 32 are moved in the axial direction relative to each other, due to the difference in lead angle between the helical rib 45 and the circumferential grooves 46. Instead of the circumferential grooves 46 of this embodiment, of which the lead angle is zero, a helical groove having a different lead angle from the helical rib 45 may be formed on the outer periphery of each planetary roller 32.

A seal cover 47 is mounted to the axially forward end of the outer ring member 31, and closes the opening of the outer ring member 31 at its axially forward end, thereby preventing entry of foreign substances into the outer ring member 31. An axially shrinkable tubular bellows 48 has one end thereof fixed to the axially forward end of the outer ring member 31, and the other end thereof fixed to the edge of the opening of the linear motion mechanism housing 11A at its axially forward end. The bellows 48 thus prevents entry of foreign substances into the space between the sliding surfaces of the outer ring member 31 and the linear motion mechanism housing 11A.

A thrust bearing 50 is mounted between each planetary roller 32 and the carrier plate 37, i.e. the carrier plate located axially rearwardly of the planetary rollers 32, to support the planetary roller 32 so as to be rotatable about its own axis. Between the carrier plate 37, i.e. the carrier plate located axially rearwardly of the planetary rollers 32, and the bearing support member 34, there are mounted a thrust plate 51 configured to rotate together with the carrier plate 37, and a thrust bearing 52 rotatably supporting the thrust plate 51.

A stopper ring 53 is fitted on the inner periphery of the linear motion mechanism housing 11A at its axially rearward end portion to restrain the axially rearward movement of the bearing support member 34. The bearing support member 34 in turn axially supports the carrier plate 37 through the thrust plate 51 and the thrust bearing 52, thereby restraining the axially rearward movement of the carrier 33. A snap ring 54 fitted on the rotary shaft 30 at its axially forward end restrains the axially forward movement of the carrier plate 36, i.e. the carrier plate located axially forwardly of the planetary rollers 32. Thus, this arrangement restrain both the axially forward and rearward movements of the carrier 33, and thus restrains both the axially forward and rearward movements of the planetary rollers 32, which are retained by the carrier 33.

The linear motion mechanism 3 is configured such that when rotation is transmitted to the rotary shaft 30 from the speed reduction mechanism 2, the planetary rollers 32 rotate about their respective axes while revolving around the rotary shaft 30. At this time, the outer ring member 31 and the planetary rollers 32 are moved in the axial direction relative to each other due to the difference in lead angle between the helical rib 45 and the circumferential grooves 46. However, since the planetary rollers 32, as well as the carrier 33, are restrained from axial movement, the planetary rollers 32 are not moved in the axial direction, and only the outer ring member 31 is moved in the axial direction. When the rotation in the direction in which the outer ring member 31 is moved axially forwardly is transmitted from the speed reduction mechanism 2 to the rotary shaft 30, the friction pads 4 and 5, shown in FIG. 1, is pressed against the disk rotor 6, so that a braking force is applied to the wheel rotating together with the disk rotor 6. When the rotation in the direction in which the outer ring member 31 is moved axially rearwardly is transmitted from the speed reduction mechanism 2 to the rotary shaft 30, the friction pads 4 and 5, shown in FIG. 1, separate from the disk rotor 6, so that the braking force applied to the wheel disappears.

Figure 6:
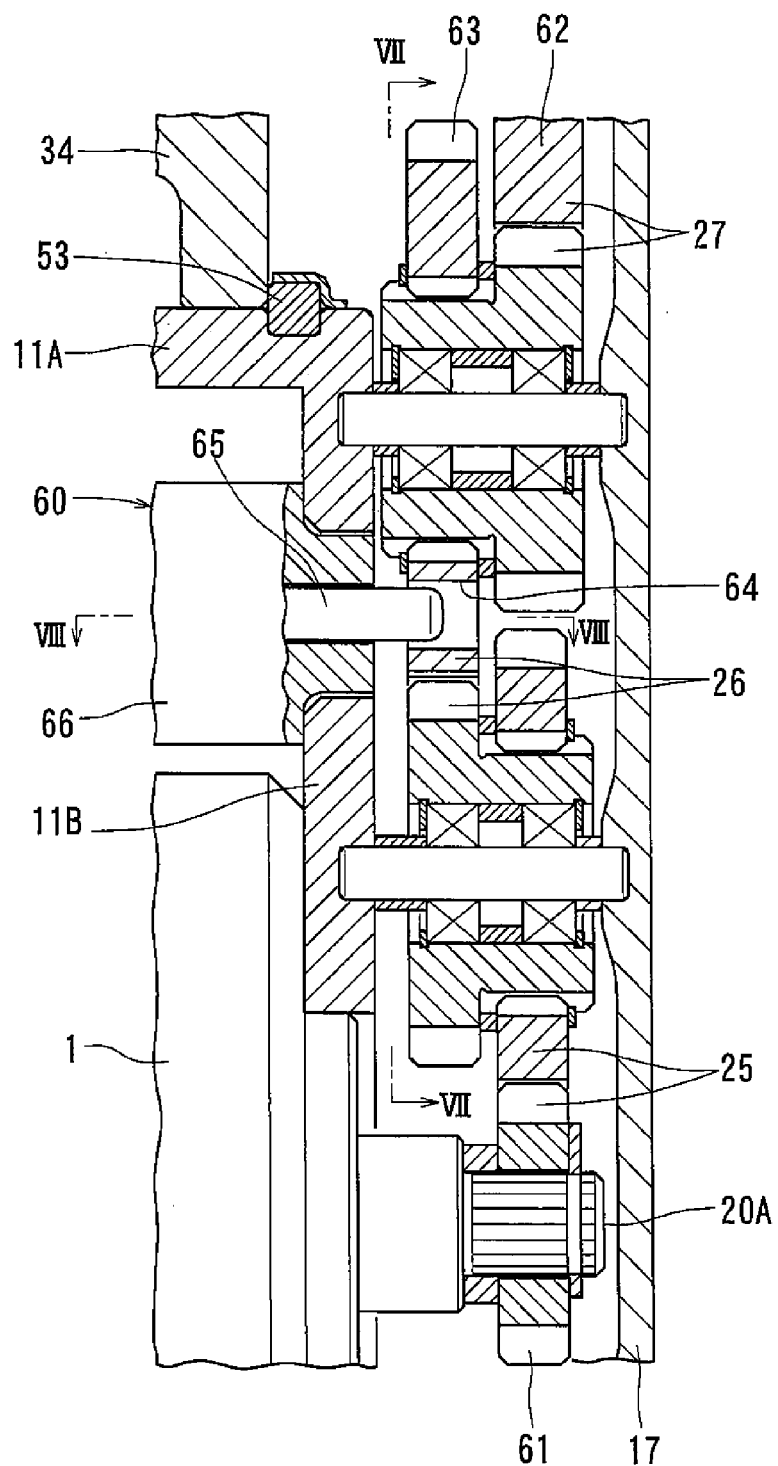
FIG. 6 is an enlarged sectional view of and around a speed reduction mechanism shown in FIG. 3.

As shown in FIG. 6, the locking mechanism 60 includes engaging holes 64 formed in an intermediate gear 63, which is one of the gears forming the speed reduction mechanism 2 and disposed in the power transmission path extending from an input gear 61 (see FIG. 3) to which the rotation of the electric motor 1 is transmitted, to an output gear 62 from which rotation is transmitted to the linear motion mechanism 3. (In this embodiment, the intermediate gear 63 is the output-side gear of the second gear train 26.) The locking mechanism 60 further includes a locking pin 65 capable of engaging in and disengaging from any one of the engaging holes 64, and a locking actuator 66 for driving the locking pin 65.

Figure 7:
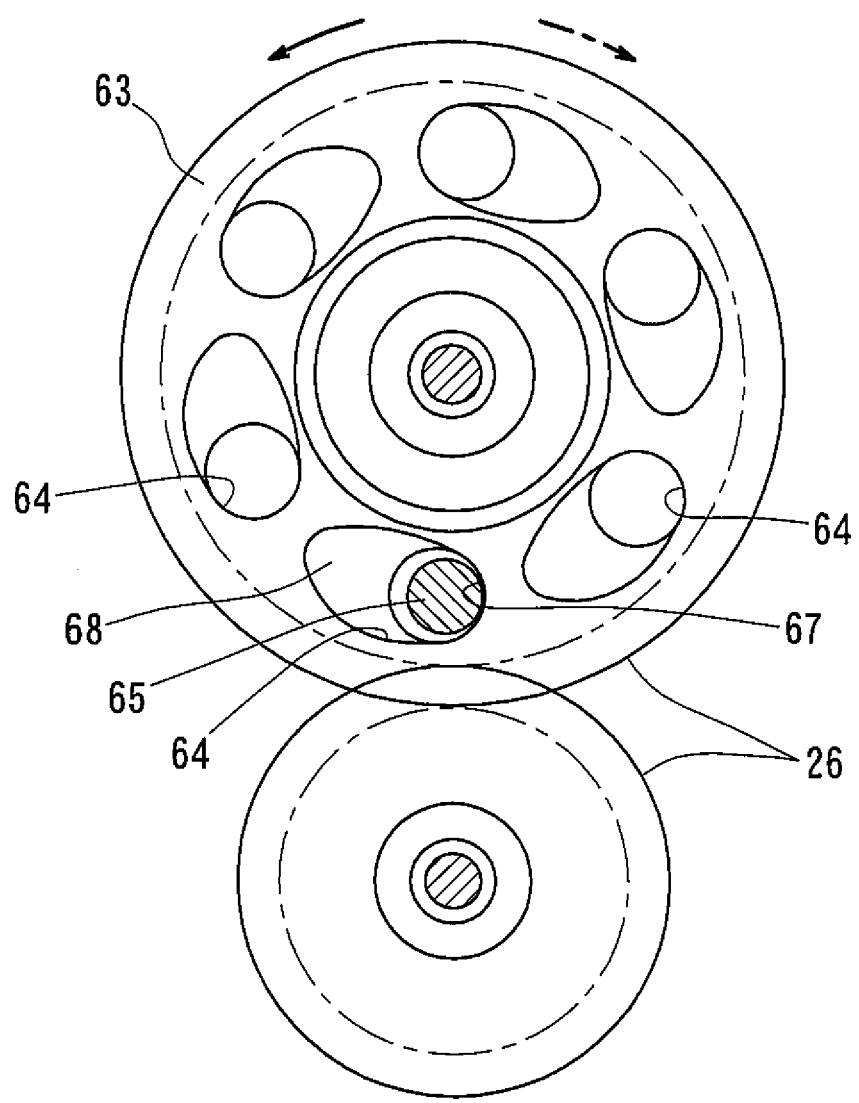
FIG. 7 is a sectional view taken along line VII-VII of FIG. 6.

As shown in FIG. 7, the engaging holes 64 are formed in one side surface of the intermediate gear 63 so as to be arranged on a common circumference while being equidistantly spaced apart from each other. The locking pin 65 is movable between the parking/locking position and the unlocking position by moving toward and away from a fixed point on the common circumference. The parking/locking position is a position where the locking pin 65 has been advanced until it is engaged in one of the engaging holes 64 of the intermediate gear 63. The unlocking position is a position where the locking pin 65 has been retracted until it is engaged in none of the engaging holes 64 of the intermediate gear 63.

Figure 8:
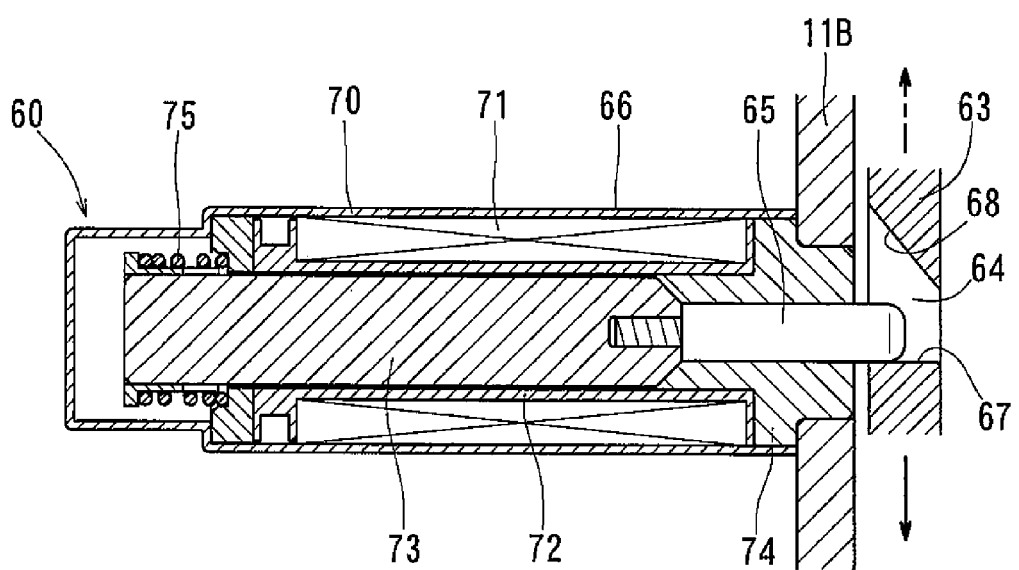
FIG. 8 is a sectional view taken along line VIII-VIII of FIG. 6.

As shown in FIG. 8, each engaging hole 64 has a stopper surface 67 arranged and shaped in such a way that when, with the locking pin 65 engaged in the engaging hole 64, torque is applied to the intermediate gear 63 in the brake-releasing direction in which the brake is released (direction shown by the broken line arrow in FIG. 8), the stopper surface 67 prevents rotation of the intermediate gear 63 in the brake-releasing direction by interfering with the locking pin 65; and a tapered surface 68 arranged and shaped in such a manner that when, with the locking pin 65 engaged in the engaging hole 64, torque is applied to the intermediate gear 63 in the braking direction in which the brake is applied (direction shown by the solid line arrow in FIG. 8), the tapered surface 68 guides the locking pin 65 in the direction in which the locking pin 65 is moved out of the engaging hole 64, thereby permitting rotation of the intermediate gear 63 in the braking direction. Thus, with the locking pin 65 engaged in one of the engaging holes 64, this engaging hole 64 serves as a ratchet by preventing rotation of the intermediate gear 63 in the brake-releasing direction and permitting rotation of the intermediate gear 63 in the braking direction.

The locking actuator 66 includes: a tubular solenoid case 70 having an open end open to the side surface of the intermediate gear 63, and a closed opposite end; a solenoid coil 71 disposed in the solenoid case 70; a tubular, non-magnetic coil bobbin 72 around which the solenoid coil 71 is wound; a rod-shaped movable iron core 73 slidably inserted in the coil bobbin 72; a fixed iron core 74 for attracting the movable iron core 73 from side of the closed end toward the open end, of the solenoid case 70 when the solenoid coil 71 is energized; and a return spring 75 biasing the movable iron core 73 from the side of the open end toward the closed end, of the solenoid case 70. The locking actuator 66 is fixed to the caliper flange 11B (see FIG. 6).

The locking pin 65 is connected to the end of the movable iron core 73 on the side of the open end of the solenoid case 70 so as to move together with the movable iron core 73. Thus, when the solenoid coil 71 is energized, the movable iron core 73 is attracted by the fixed iron core 74, and moved from the side of the closed end toward the open end, of the solenoid case 70, and with the movement of the movable iron core 73 in this direction, the locking pin 65 is advanced from the unlocking position toward the parking/locking position. On the other hand, when the solenoid coil 71 is de-energized, the movable iron core 73 is moved from the side of the open end toward the closed end, of the solenoid case 70 under the biasing force of the return spring 75, and with the movement of the movable iron core 73 in this direction, the locking pin 65 is retracted from the parking/locking position toward the unlocking position.

Figure 9:
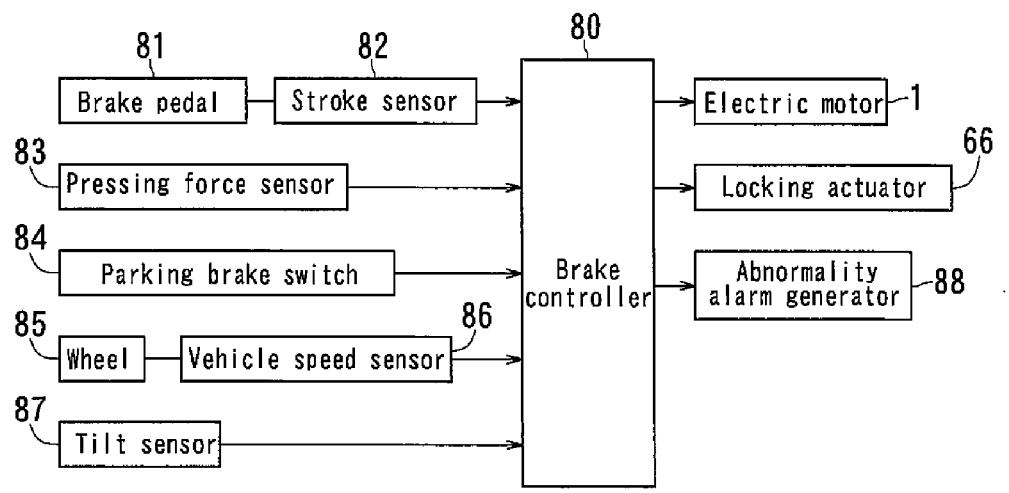
FIG. 9 is a block diagram showing the control system of the electric brake system shown in FIG. 3.

The electric motor 1 and the locking actuator 66 of this electric brake system are controlled by a brake controller 80 shown in FIG. 9. The brake controller 80 has connected to its input a stroke sensor 82 for detecting the operating amount of a brake pedal 81, pressing force sensor 83 for detecting the pressing force with which the friction pad 5 is pressed against the disk rotor 6, a parking brake switch 84 operated by a driver, a vehicle speed sensor 86 for detecting the current number of rotations of the wheel 85, and a tilt sensor 87 for detecting the tilting of the road surface.

The pressing force sensor 83 may be configured to detect the pressing force with which the friction pad 5 is pressed against the disk rotor 6 based on the deflection or displacement of the bearing support member 34, which is configured to be deflected when the friction pad 5 is pressed against the disk rotor 6, corresponding to the pressing force with which the friction pad 5 is pressed against the disk rotor 6, or may be configured to detect the pressing force with which the friction pad 5 is pressed against the disk rotor 6 based on the pressure generated between the thrust bearing 52 and the bearing support member 34 when the friction pad 5 is pressed against the disk rotor 6.

The brake controller 80 has connected to its output the electric motor 1, the locking actuator 66, and an abnormality alarm generator 88. The abnormality alarm generator 88 is an on-board device for notifying the driver of abnormality of the parking brake, and may be in the form of a monitor display, a brake alarm lamp, or an audio output device, which is provided near the driver's seat.

Figure 10:
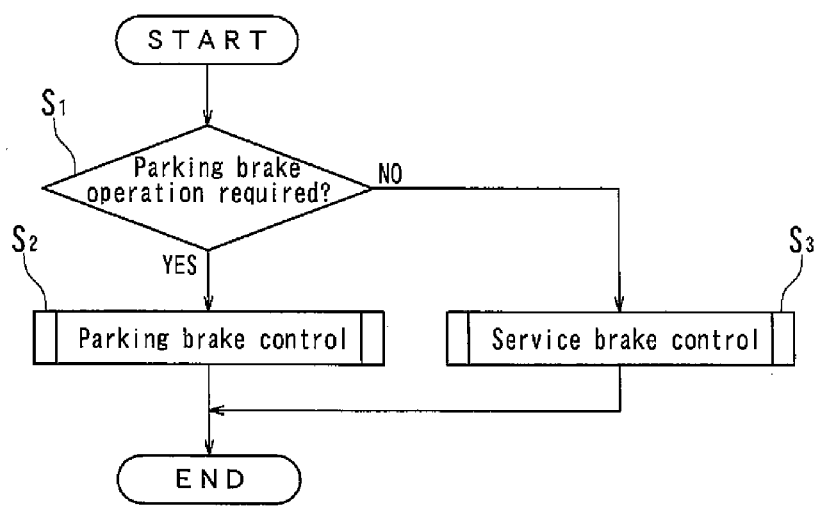
FIG. 10 is a flowchart showing an exemplary control performed by a brake controller shown in FIG. 9.
Figure 11:
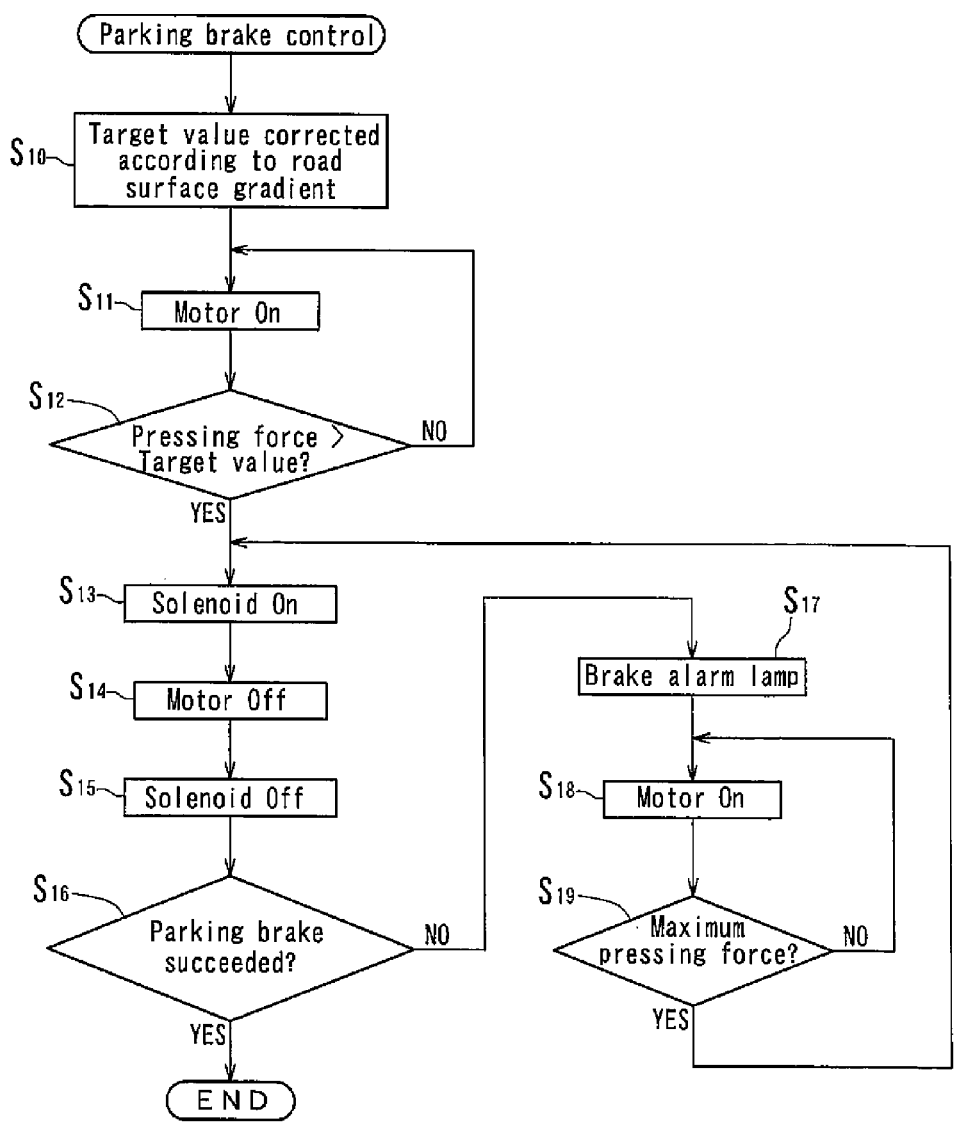
FIG. 11 is a flowchart showing an exemplary parking brake control shown in FIG. 10.
Figure 12:
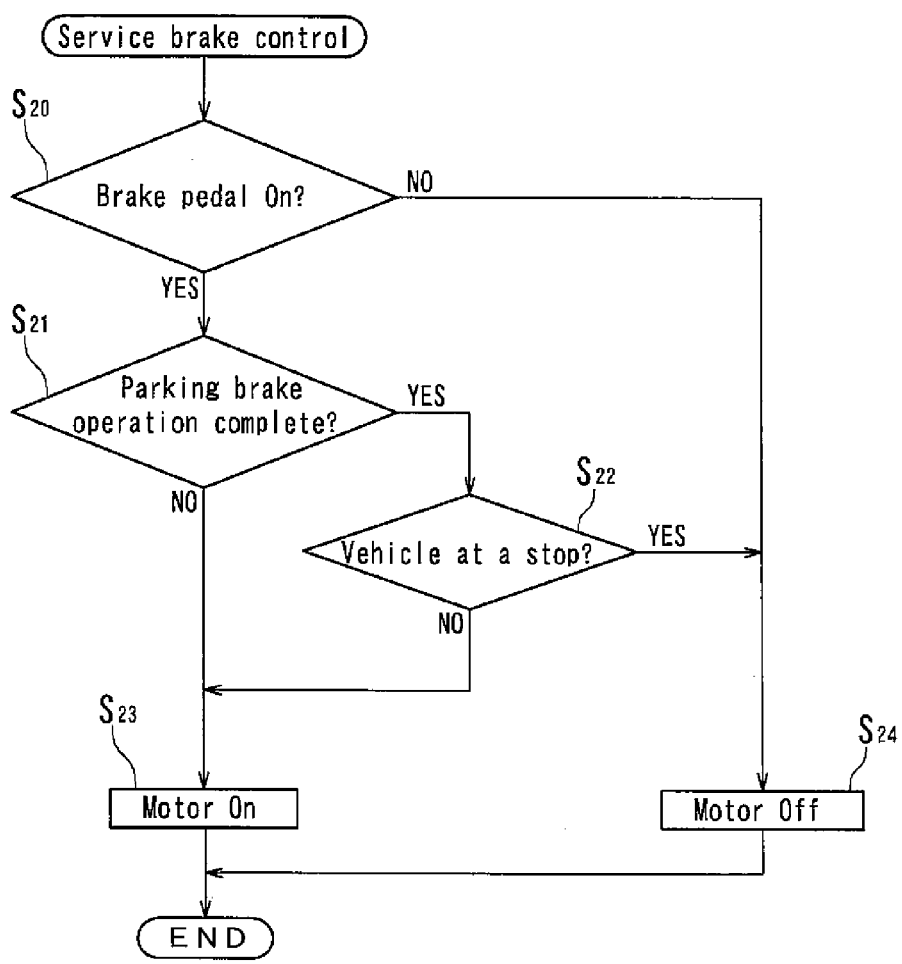
FIG. 12 is a flowchart showing an exemplary service brake control shown in FIG. 10.

Now referring to FIGS. 10 to 12, description is made of how, by way of example, the electric motor 1 and the locking actuator 66 are controlled by the brake controller 80.

As shown in FIG. 10, the brake controller 80 determines whether or not there exists a request to apply a parking brake (Step $S_1$), and performs parking brake control when there exists such a request (Step $S_2$). The brake controller 80 may be configured to determine that there exists a request to apply a parking brake when e.g. the driver operates the parking brake switch 84, or otherwise, when the driver selects the parking range by operating the shift lever.

When the brake controller 80 determines that there exists no request to apply a parking brake, the brake controller 80 performs service brake control (Step $S_3$). During the service brake control, the brake controller 80 applies a braking force to the wheel by actuating the electric motor 1 when the brake pedal 81 is operated.

The parking brake control is described with reference to FIG. 11. When there exists a request to apply a parking brake, the brake controller 80 energizes the electric motor 1, and drives the electric motor 1 so that the pressing force with which the friction pad 5 is pressed against the disk rotor 6 (namely, the pressing force detected by the pressing force sensor 83) reaches a predetermined target value (Steps $S_{11}$ and $S_{12}$).

When the pressing force with which the friction pad 5 is pressed against the disk rotor 6 reaches the target value, the brake controller 80 actuates the locking actuator 66 to advance the locking pin 65 from the unlocking position to the parking/locking position, while keeping the electric motor 1 energized (Step $S_{13}$). Thereafter, with the locking actuator 66 kept actuated, the brake controller 80 de-energizes the electric motor 1 (Step $S_{14}$), and then de-energizes the locking actuator 66 (Step $S_{15}$).

When the locking actuator 66 is actuated, if, as shown in FIG. 8, the locking pin 65 is aligned with any one of the engaging holes 64 of the intermediate gear 63, the locking pin 65 is engaged in this engaging hole 64, while if the locking pin 65 is aligned with none of the engaging holes 64, the locking pin 65 may not be instantly engaged in any of the engaging holes 64. However, even in such a situation, when the electric motor 1 is de-energized, the intermediate gear 63 is rotated in the brake-releasing direction (direction shown by the broken line arrow in FIG. 8) under the reaction force to the pressing force with which the friction pad 5 is pressed against the disk rotor 6, until the locking pin 65 is aligned with one of the engaging holes 64, so that, eventually, the locking pin 65 is engaged in this engaging hole 64.

When the electric motor 1 is de-energized, torque in the brake-releasing direction is being applied to the intermediate gear 63 under the reaction force to the pressing force with which the friction pad 5 is pressed against the disk rotor 6 (this torque is hereinafter referred to as "reaction force torque"), so that frictional resistance is generated between the intermediate gear 63 and the locking pin 65 due to the reaction force torque. By this frictional resistance, the intermediate gear 63 and the locking pin 65 remain engaged with each other after the electric motor 1 and the locking actuator 66 have been de-energized.

Next, as shown in FIG. 11, the brake controller 80 determines whether or not the parking brake has been successfully applied (Step $S_{16}$), and if the parking brake is determined to have been successfully applied, the brake controller 80 ends the parking brake control. This determination may be made depending on e.g. whether or not the vehicle speed detected by the vehicle speed sensor 86 remains zero for a predetermined period of time. If the vehicle speed detected by the vehicle speed sensor 86 is not maintained at zero, this indicates that the vehicle could be moving due e.g. to the gradient of the road surface, so that the brake controller 80 determines that the parking brake has not been successfully applied.

If it is determined that the parking brake has not been successfully applied, the brake controller 80 activates the abnormality alarm generator 88 to notify the driver of the failure of the parking brake (Step $S_{17}$), and re-energizes the electric motor 1 to drive the electric motor 1 so that the pressing force with which the friction pad 5 is pressed against the disk rotor 6 reaches a predetermined maximum value (Steps $S_{18}$ and $S_{19}$). This reliably stops the vehicle, which has been moving due to e.g. to the gradient of the road surface. Thereafter, the brake controller 80 actuates the locking actuator 66 to again advance the locking pin 65 from the unlocking position toward the parking/locking position (Step $S_{13}$); then de-energizes the electric motor 1 with the locking actuator 66 actuated (Step $S_{14}$); and finally de-energizes the locking actuator 66 (Step $S_{15}$).

In order to prevent the vehicle from moving due e.g. to the gradient of the road surface after the parking brake has been applied, the brake controller 80 may be configured to correct the target value of the pressing force such that the target value when the road surface has a gradient is larger than the target value when the road surface has no gradient (Step $S_{10}$). With this arrangement, the friction pad 5 is pressed against the disk rotor 6 with a larger pressing force when the parking brake is applied on a road surface having a gradient than when the parking brake is applied on a road surface having no gradient. This prevents the vehicle from beginning to move after applying the parking brake on a road surface having a gradient, and thus ensures safety of the vehicle.

When releasing the parking brake, in order to retract the locking pin 65, shown in FIG. 8, to the unlocking position, the brake controller 80 energizes the electric motor 1 so that the intermediate gear 63 slightly rotates in the braking direction, while keeping the locking actuator 66 not energized. When the intermediate gear 63 rotates in this direction, the frictional resistance between the inner surface of the engaging hole 64 of the intermediate gear 63 and the locking pin 65 disappears, so that the locking pin 65 is now biased by the return spring 75 toward the unlocking position, and the distal end of the locking pin 65 is pushed out of the engaging hole 64 by the action of the tapered surface 68 of the engaging hole 64. As a result, the locking pin 65 is retracted from the parking/locking position to the unlocking position. Thereafter, the brake controller 80 reverses the electric motor 1 to release the braking force applied to the wheel 85.

Now referring to FIG. 12, the service brake control is described. The brake controller 80 first determines whether or not the brake pedal 81 is being operated (Step $S_{20}$). If the brake pedal 81 is being operated, the brake controller 80 determines whether or not the parking brake operation has completed (Step $S_{21}$), and whether or not the vehicle is at a stop (Step $S_{22}$).

It is possible to determine whether or not the parking brake operation has completed by determining that the parking brake operation has completed during the entire period of the parking brake control after the parking brake is determined to have been successfully applied (Step $S_{16}$) until the parking brake is released. It is also possible to determine whether or not the parking brake operation has completed based on whether or not the locking pin 65 is at the parking/locking position. It is possible to detect the position of the locking pin 65 based on the current flowing through the solenoid coil 71 when a pulse voltage or an alternating voltage is applied to the solenoid coil 71. It is possible to determine whether or not the vehicle is at a stop based on the output signal of the vehicle speed sensor 86.

When the brake controller 80 determines that the parking brake operation has not completed (Step $S_{21}$), or that the vehicle is not at a stop (Step $S_{22}$), the brake controller 80 energizes the electric motor 1 and drives the electric motor 1 so that the pressing force with which the friction pad 5 is pressed against the disk rotor 6 reaches the value corresponding to the operating amount of the brake pedal 81 (Step $S_{23}$).

When the brake controller 80 determines that the parking brake operation has completed and that the vehicle is at a stop, the brake controller 80 does not energize the electric motor 1 even if the brake pedal 81 is operated, namely, prohibits the actuation of the electric motor 1 (Steps $S_{21}$, $S_{22}$ and $S_{24}$).

By using this electric brake system, when the brake pedal 81 is operated with the parking brake operation completed, it is possible to prevent unintended release of the parking brake, for the following reasons.

While the vehicle is at a stop, and the parking brake is being applied, the vehicle is ordinarily remains at a stop even if the brake pedal 81 is not operated. However, even in such a situation, a driver may sometimes depress the brake pedal 81. (For example, the driver may depress the brake pedal 81 while waiting at the red light with the parking brake applied, or may unconsciously depress the brake pedal 81 while waiting in the parked vehicle.)

If the electric motor 1 is actuated when the brake pedal 81 is operated in such a situation, and once the torque transmitted from the electric motor 1 to the intermediate gear 63 exceeds the reaction force torque (i.e. the torque applied to the intermediate gear 63 in the brake-releasing direction due the reaction force to the pressing force with which the friction pad 5 is pressed against the disk rotor 6 when the parking brake is applied), the frictional resistance between the intermediate gear 63 and the locking pin 65, shown in FIG. 8, may disappear, causing the locking pin 65 to be retracted from the parking/locking position to the unlocking position under the force of the return spring 75, whereby the locking pin 65 disengages from the engaging hole 64 of the intermediate gear 63.

If this happens, when the driver releases the brake pedal 81 thereafter, the locking pin 65 remains disengaged from the engaging hole 64 of the intermediate gear 63 (and thus the parking brake disengaged) in spite of the fact that the driver believes that the parking brake is being applied. If the vehicle is on a slope when this happens, the vehicle will spontaneously begin to move under the weight of the vehicle. Even if the vehicle is on a horizontal road surface, if the vehicle is an AT or CVT vehicle with a torque converter, the vehicle will still begin to move spontaneously due to creep torque transmitted to the wheels from the engine through the torque converter. This poses a grave danger.

In contrast, the electric brake system according to the present invention is configured, as shown in FIG. 12, such that while the vehicle is at a stop, and the parking brake operation has completed, the actuation of the electric motor 1 is prohibited even if the driver operates the brake pedal 81 (Steps $S_{21}$, $S_{22}$ and $S_{24}$). This in turn prevents transmission of torque from the electric motor 1 to the intermediate gear 63, thus preventing the locking pin 65 from becoming disengaged from the intermediate gear 63. Also, since the electric motor 1 is not actuated when the parking brake operation has completed, and while the vehicle is at a stop, even when the brake pedal 81 is operated, it is possible to reduce the power consumed by the electric motor 1 and also reduce the noise of the electric motor 1.

This electric brake system is further configured such that when it is determined that the vehicle is not at a stop, the actuation of the electric motor 1 is permitted when the brake pedal 81 is operated (Steps $S_{22}$ and $S_{23}$). That is, even after the parking brake operation has completed, if the vehicle is not at a stop, the electric motor 1 can be actuated when the brake pedal 81 is operated. This makes it possible to apply a braking force as a service brake if, for example, the vehicle should begin to move due e.g. to the gradient of the road surface in spite of the fact that the parking brake operation has completed, and the driver depresses the brake pedal 81 in an attempt to stop the vehicle. This feature thus ensures safety of the vehicle.

While it may be determined whether or not the vehicle is at a stop based on the current position of the vehicle as detected by a GPS receiver on board the vehicle, this arrangement has a drawback in that while the vehicle is hidden from a GPS satellite by an obstacle such as a building, it is difficult to determine whether or not the vehicle is at a stop with high accuracy. Therefore, as in the above-described embodiment, it is preferable to determine whether or not the vehicle is at a stop based on the output signal of the vehicle speed sensor 86 for detecting the rotation of the wheel 85. With this arrangement, even while the vehicle is hidden from a GPS satellite, it is possible to accurately determine whether or not the vehicle is at a stop, and thus to perform reliable control.

Figure 13:
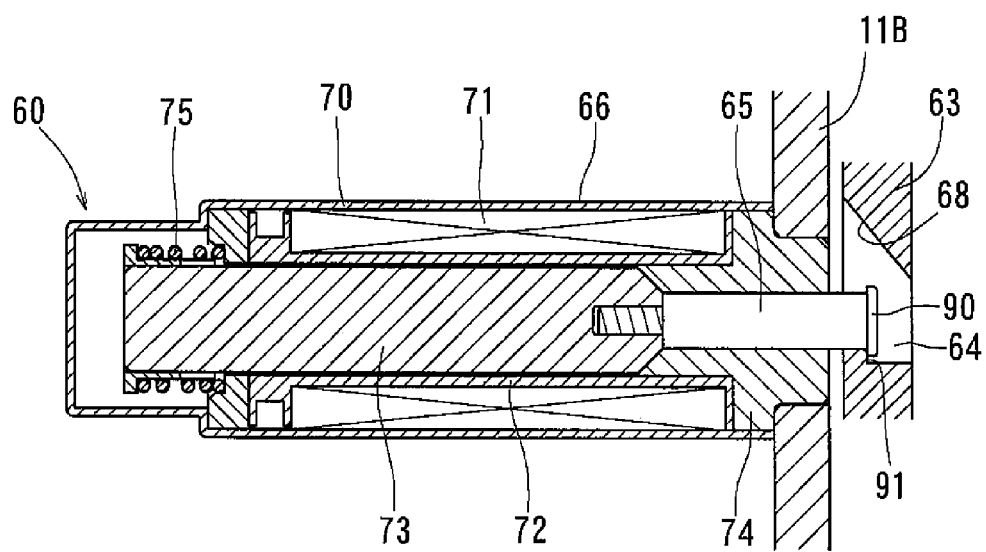
FIG. 13 is a sectional view of a modification of a locking mechanism shown in FIG. 8.

In the above embodiment, the intermediate gear 63 and the locking pin 65 are maintained in engagement with each other utilizing frictional resistance generated between the inner surface of the engaging hole 64 of the intermediate gear 63 and the outer periphery of the locking pin 65 when the parking brake is applied. However, the present invention is applicable to the arrangement shown in FIG. 13, in which the intermediate gear 63 and the locking pin 65 are maintained in engagement with each other by bringing a protrusion 90 formed on the outer periphery of the locking pin 65 into engagement with a step 91 formed on the inner surface of the engaging hole 64 of the intermediate gear 63.

In the above embodiment, as the locking actuator 66 for moving the locking pin 65 between the parking/locking position and the unlocking position, a push type solenoid is used which is configured to spontaneously return to the original position under the biasing force of the return spring 75 when the solenoid coil 71 is de-energized. Instead, however, a self-retaining type solenoid may be used to which is mounted a permanent magnet capable of retaining the movable iron core 73 in the original position when the solenoid coil 71 is de-energized. While a solenoid type linear motion actuator is used as the locking actuator 66 in the above embodiment, a linear motion actuator which is electrically driven in a different manner may be used instead.

In the above embodiment, as the locking member to be engaged with and disengaged from the intermediate gear 63, the rod-shaped locking pin 65 is used, which is movable toward and away from the side surface of the intermediate gear 63. However, the locking member may be instead a locking claw configured to pivot and come into and out of engagement with the outer periphery of the intermediate gear 63.

In the above embodiment, the rotary member with which the locking member comes into and out of engagement is an intermediate gear 63 of the speed reduction mechanism 2, but may be any other rotary member that is in the power transmission path through which the power of the electric motor 1 is transmitted to the braking mechanism 7, such as a rotary member constituting the linear motion mechanism 3 (including the rotary shaft 30 or the carrier 33).

In the above embodiment, as the braking mechanism for applying a braking force to the wheel, a disk type braking mechanism is used which is configured to press a friction pad against a disk rotor which rotates together with a wheel, but the present invention is also applicable to a drum type braking mechanism which is configured to press a brake shoe as a friction member against the inner periphery of a drum.

DESCRIPTION OF THE DRAWINGS

1. Electric motor
5. Friction pad
6. Disk rotor
7. Braking mechanism
63. Intermediate gear
65. Locking pin
66. Locking actuator
80. Brake controller
81. Brake pedal
85. Wheel
86. Vehicle speed sensor

What is claimed is:
1. An electric brake system with a parking function comprising:
an electric motor;
a braking mechanism configured to press a friction member against a rotor which rotates together with a wheel of a vehicle, under a power of the electric motor, thereby applying a braking force to the wheel;
a rotary member disposed in a power transmission path through which the power of the electric motor is transmitted to the braking mechanism;
a locking member movable between a parking/locking position at which the locking member is brought into engagement with the rotary member in such a manner that the rotary member is prevented from rotating in a brake-releasing direction in which the braking force is released, and an unlocking position at which the locking member is disengaged from the rotary member;

a locking actuator configured to move the locking member between the parking/locking position and the unlocking position; and a brake controller for controlling the electric motor and the locking actuator, wherein the brake controller comprises:

a service brake controller for performing a control in which when a brake pedal of the vehicle is operated, the electric motor is actuated to apply the braking force to the wheel;

a parking brake controller for performing a control in which when there exists a request to apply a parking brake, the electric motor is actuated to apply the braking force to the wheel, and with the braking force applied to the wheel, the locking actuator is actuated to move the locking member from the unlocking position to the parking/locking position;

a parking brake determining arrangement configured to determine whether or not a parking brake operation by the parking brake controller has completed;

a vehicle stoppage determining arrangement configured to determine whether or not the vehicle is at a stop;

a motor actuation prohibiting arrangement configured to prohibit the service brake controller from actuating the electric motor when the vehicle stoppage determining arrangement determines that the vehicle is at a stop, and when the parking brake determining arrangement determines that the parking brake operation has completed; and a motor actuation permitting arrangement configured to permit the service brake controller to actuate the electric motor when the parking brake determining arrangement determines that the parking brake operation by the parking brake controller has completed; when the vehicle stoppage determining arrangement determines that the vehicle is not at a stop, and when the brake pedal is operated.

2. The electric brake system with the parking function of claim 1, wherein the vehicle stoppage determining arrangement is configured to determine whether or not the vehicle is at a stop based on an output signal of a vehicle speed sensor for detecting rotation of the wheel.

3. The electric brake system with the parking function of claim 1, wherein the vehicle stoppage determining arrangement is configured to determine whether or not the vehicle is at a stop based on a current position of the vehicle detected by a GPS receiver on board the vehicle.

4. The electric brake system with the parking function of claim 1, wherein the parking brake controller comprises:

a motor actuation controller configured, when there exists the request to apply the parking brake, to actuate the electric motor such that a pressing force with which the friction member is pressed against the rotor reaches a predetermined target value;

a locking actuator actuation controller configured, when the pressing force reaches the target value by the motor actuation controller, to actuate the locking actuator such that the locking member is moved from the unlocking position to the parking/locking position;

a motor de-energizing controller configured to de-energize the electric motor while the locking actuator is being actuated after the locking actuator is actuated by the locking actuator actuation controller; and a locking actuator de-energizing controller configured to de-energize the locking actuator after the electric motor is de-energized by the motor de-energizing controller.

5. The electric brake system with the parking function of claim 4, wherein the parking brake controller further comprises a target value correcting arrangement for correcting the target value such that the target value is larger when the vehicle is on an inclined road surface than when the vehicle is on a road surface not inclined.

* * * * *